United States Patent [19]

Kerjean

[11] Patent Number: 4,788,029
[45] Date of Patent: Nov. 29, 1988

[54] APPARATUS FOR STORING FUEL ASSEMBLIES IN POOL

[75] Inventor: Joël Kerjean, Saint Herblain, France

[73] Assignee: Ets. Lemer & Cie., Carque Fou Cedex, France

[21] Appl. No.: 39,858

[22] Filed: Apr. 20, 1987

Related U.S. Application Data

[63] Continuation-in-part of Ser. No. 732,792, Apr. 26, 1985, abandoned.

[51] Int. Cl.⁴ ............................................. G21C 19/40
[52] U.S. Cl. ..................................................... 376/272
[58] Field of Search ............... 376/272, 287, 288, 447; 250/506.1, 507.1

[56] References Cited

U.S. PATENT DOCUMENTS

| | | | |
|---|---|---|---|
| 4,006,362 | 2/1977 | Mollon et al. | 376/272 |
| 4,010,375 | 3/1977 | Wachter et al. | 376/272 |
| 4,096,392 | 6/1978 | Rubinstein et al. | 376/272 |
| 4,115,700 | 9/1978 | Groves | 376/272 |
| 4,143,277 | 3/1979 | Krieger | 376/272 |
| 4,203,038 | 5/1980 | Takahashi et al. | 376/272 |
| 4,248,668 | 2/1981 | Dixon et al. | 376/272 |
| 4,342,620 | 8/1982 | Vickrey | 376/272 |
| 4,366,115 | 12/1982 | Schlumpf | 376/272 |
| 4,382,060 | 5/1983 | Holtz et al. | 376/272 |
| 4,710,342 | 12/1987 | Helary et al. | 376/272 |

FOREIGN PATENT DOCUMENTS

| | | | |
|---|---|---|---|
| 2730850 | 1/1979 | Fed. Rep. of Germany | 376/272 |
| 2742736 | 4/1979 | Fed. Rep. of Germany | 376/272 |
| 2304993 | 10/1976 | France | 376/272 |

Primary Examiner—Deborah L. Kyle
Assistant Examiner—Daniel Wasil
Attorney, Agent, or Firm—Pollock, Vande Sande & Priddy

[57] ABSTRACT

Apparatus for storing fuel elements in cells placed at the bottom of a pool and separated by a water gap, the walls of the cells being externally covered with a neutrophage material layer. A layer constituted by a single thin cadmium sheet continuously covers the outer surface of the walls in accordance with the periphery of the cell. This single thin sheet is held in place and protected by a thin metal plate, preferably of stainless steel.

3 Claims, 2 Drawing Sheets

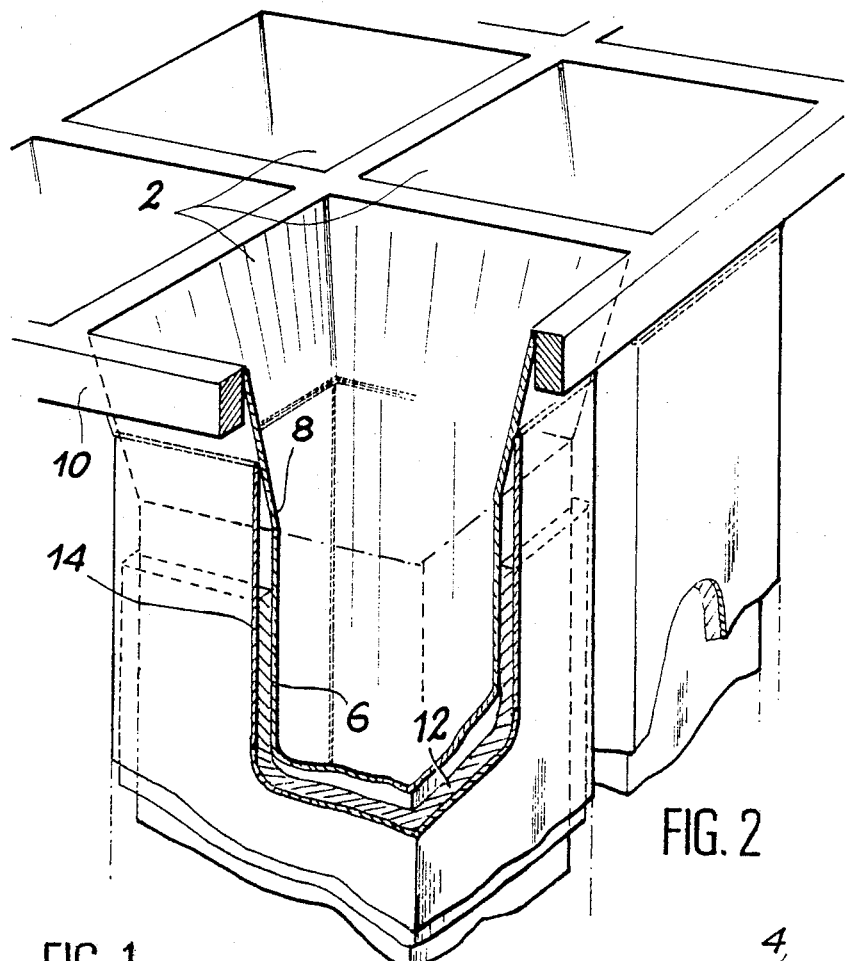
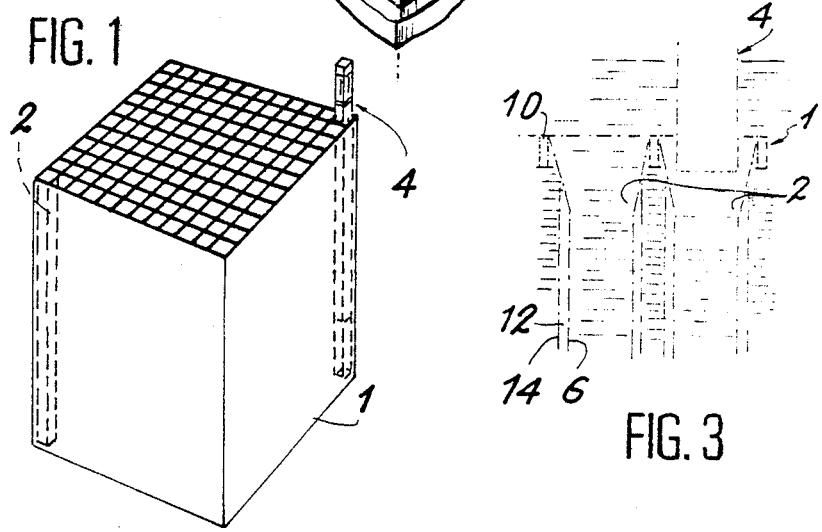

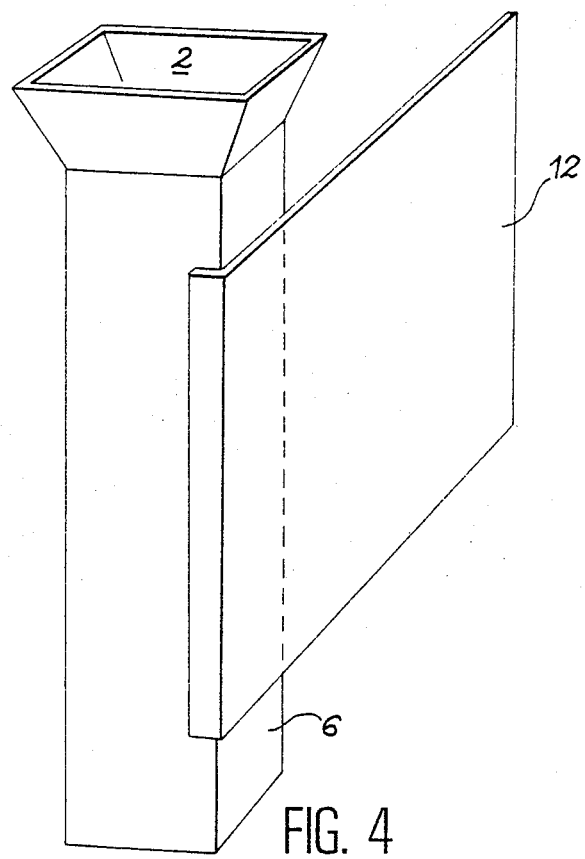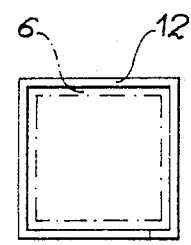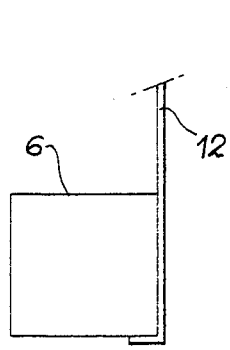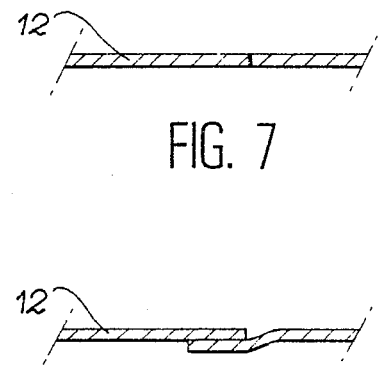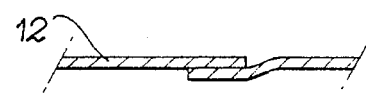

APPARATUS FOR STORING FUEL ASSEMBLIES IN POOL

CROSS REFERENCE TO RELATED APPLICATION

The present application is a continuation-in-part of U.S. application Ser. No. 732,792, filed Apr. 26, 1985, now abandoned.

FIELD OF THE INVENTION

The present invention relates to an improvement made to apparatus for storing nuclear fuel assemblies in pools.

BACKGROUND OF THE INVENTION

In nuclear power plants, the fuel assemblies not being used during the operation of the core of the reactors are stored in means constituted by metal cells regularly distributed in the storage pools. At present, the spacings between the cells are relatively large, because the water between the cells principally acts as a neutrophage moderator to prevent starting of a nuclear fission reaction.

However, increasing efforts are being made to increase the capacity of pools by reducing the spacings between the cells, particularly in order to permit greater flexibility with respect to reprocessing or decay delays. In other words, pools are too small to permit the storage of whole fuel assemblies irradiated during many cycles in the core of the nuclear reactor in case of postponement due to the unavailability of the reprocessing plant or of the final dry storage site. Such space reduction leads to a reduction in the thickness of the water gaps separating the walls of two adjacent cells. It is consequently necessary to compensate the moderator loss due to this reduction in the thickness in the water gap. The solution most frequently used consists of covering the walls of the cells with a neutrophage product. The most frequently used products are boron and its derivatives (boron aluminum, boron graphite, boron carbide, etc.). A first solution consists of using some of these by projecting fine particles directly on to the outer walls of the cell, and the necessary adhesion requirements may necessitate plasma projection spraying with the use of chrome and nickel as the binder. A second known solution consists of eliminating the water gap between the cells and placing the neutrophage product in a tight recess constituted by peripheral welding of contiguous walls of adjacent cells. A third solution, disclosed for example in U.S. Pat. No. 4,006,362, consists of using panels of neutrophage products, i.e., boron aluminum known by the trademark BORAL, fitted or joined to each wall of the cells in such manner that each panel ensures a like continuous layer of neutrophage protection.

The first solution is difficult to carry out and encounters major problems during manufacture of the cells. The second known solution without the water gap between the cells excludes the use of certain economically and technically suitable neutrophage materials and precludes easy dismountability of each cell located in the storage pool. The third solution fails to avoid neutron escapes through the angles of the cells because neutrophage materials do not ensure perfect continuous contact between the vertical edges of two adjacent panels in the corners of the cell. Moreover, the weight of individual modular panels presents many problems during final assembly of the cell, and the moderator quality imposes the use of thick panels.

SUMMARY OF THE INVENTION

The object of the present invention is to eliminate the disadvantages indicated hereinabove, by use of a fuel assemblies storage apparatus which is easier to manufacture as regards the neutron protection material.

The invention therefore relates to an apparatus for the storage of fuel assemblies in which the latter are placed in cells defined by metal walls, each cell being separated from adjacent cells by a water gap, the outer surface of said walls being covered by a layer of neutrophage material, said layer being constituted by a single thin cadmium sheet covering, in a continuous manner, the outer surface of said metal walls, in accordance with the periphery of the cell, and wherein the thin sheet is held in place and protected by a thin metal plate extending over at least part of the vertical surface of the cell.

According to another feature of the apparatus according to the invention, the thickness of the cadmium layer is between about 0.1 and 1 mm, and preferably between 0.1 and 0.5 mm. The thin metal plate is preferably made of stainless steel, and its thickness is between 0.5 and 1 mm.

BRIEF DESCRIPTION OF THE DRAWINGS

The invention will now be described in greater detail relative to exemplary embodiments as shown in the attached drawings, wherein:

FIG. 1 is a diagrammatic perspective view of an apparatus for storing fuel elements in a pool;

FIG. 2 is a partly sectional perspective view, in larger scale, of the upper part of a cell of the apparatus according to FIG. 1;

FIG. 3 is a schematic view showing the racks in chain-dotted lines and the sheet of water between the racks;

FIG. 4 is a perspective view of a cell 2 on wall 6 of which is disposed a single cadmium sheet 12 which, according to its dimensions, can completely, i.e., without any discontinuity, cover the four cell walls;

FIG. 5 is a plan view of FIG. 4;

FIG. 6 is a plan view showing the cell covered by the sheet; and

FIGS. 7 and 8 show two possible joints, FIG. 7 being a butt joint and FIG. 8 a lap joint.

DETAILED DESCRIPTION OF PREFERRED EMBODIMENTS

FIG. 1 shows a storage apparatus 1 comprising a large number of vertically arranged cells 2, into which are introduced fuel assemblies 4. The number of cells in this type of apparatus 1 is approximately 100 to 200, and there are generally several apparatuses of this type in a pool, each resting on the bottom of the pool via a support system (not shown).

FIG. 2 shows in greater detail the upper part of a cell 2. In the illustrated embodiment, the cells have a square cross-section and are bounded by metal plates 6, generally made of stainless steel. The upper part 8 of each plate 6 forms an angle with the remainder of the plate, such that the cross-section of the cell is larger in the upper part of the storage apparatus. This facilitates introduction of fuel assemblies into the cells. Moreover, in order to ensure greater rigidity of the system, the upper parts of the cells are joined by longitudinal beams 10, welded to part 8 of plates 6.

The cells are arranged very close to one another in order to increase the storage capacity of the apparatus, the thickness of the water gap between two adjacent cells being reduced to approximately 50 mm, and it is necessary to coat the outer surface of walls 6 with a continuous layer of a neutrophage product 12 which, in the preferred embodiment of the invention, is constituted by a single thin cadmium sheet. The latter is held in place by a thin metal plate 14, which is generally of stainless steel and which also protects it against corrosion.

FIG. 4 is a perspective view of cell 2. It will be noted that on the walls 6 constituting the cell a single sheet 12 constituted essentially of cadmium is represented schematically so as to show that there is in fact only one sheet which, according to the invention can, by its dimensions, constitute, without any discontinuity whatever, the entire covering for the four faces of the cell.

FIG. 6 shows a section of a cell 6 in a rectilinear part of a cell covered by a sheet 12. It will be seen that a single layer 12 surrounds the four faces in a continuous manner, including each of the corners defined by the cell.

FIG. 7 show a butt joint, i.e., in this embodiment the sheet is cut to precise dimensions so that the two ends thereof come into perfect contact, thus assuring a complete connection.

FIG. 8 shows a lap joint. Here, the sheet is so dimensioned as to enable covering at the height of the joint. There is no manufacturing or crowding problem because of the slight thickness of the cadmium layer.

Practical tests have shown that cadmium, in certain special configurations, and particularly in the case where the cells are separated by water gap having a thickness between 40 and 60 mm, and preferably between 45 and 55 mm, has excellent neutrophage properties even if the thickness of the layer is small, i.e., below 1 mm. For example, with a cell spacing of 280 mm, the cells having a square cross-section of internal dimensions 225×225 mm, 2 mm thick metal plates 6 and 1 mm thick metal plates 14, a 0.5 mm thick cadmium layer makes it possible to obtain with a water gap 48 mm thick, a Keff multiplication factor equal to or below 0.95 for fuel assemblies with an enrichment equal to or below 4.5%.

The apparatus according to the invention has particular advantages, because cadmium in single sheet form is easier to fit in a continuous manner around cells than the compact prior art material. Thus, it is possible to reduce the cost of the complete storage apparatus while retaining the same neutron protection characteristics.

What is claimed is:

1. Apparatus for the storage of irradiated nuclear fuel assemblies, said apparatus being located in a storage pool and comprising cells defined by first metal walls for receiving said fuel assemblies, each of said first metal walls being separated from adjacent first metal walls by a water gap having a thickness between 40 and 60 mm, said first metal walls being covered by a layer of nutrophage material constituted by a single cadmium sheet having a thickness between 0.1 and 1 mm and being located on the periphery of said cells and on at least part of a vertical outer surface of said walls of said cells, so as to cover without discontinuity the periphery of said cells, and wherein said sheet is held in place and protected by a second metal plate having a thickness between 0.5 and 1 mm, said single cadmium sheet and said second metal plate extending over at least part of the vertical surface of said cells.

2. An apparatus according to claim 1, wherein the thickness of the cadmium sheet is between 0.1 and 0.5 mm.

3. An apparatus according to claim 1, wherein the thickness of the water gap is between 45 and 55 mm.

* * * * *